US007666089B2

(12) United States Patent
Rodgers et al.

(10) Patent No.: US 7,666,089 B2
(45) Date of Patent: Feb. 23, 2010

(54) GAMING DEVICE HAVING ACCUMULATION GAME WITH CHANGING SELECTIONS

(75) Inventors: Paulina Rodgers, Reno, NV (US); Anthony J. Baerlocher, Reno, NV (US)

(73) Assignee: IGT, Reno, NV (US)

(*) Notice: Subject to any disclaimer, the term of this patent is extended or adjusted under 35 U.S.C. 154(b) by 605 days.

(21) Appl. No.: 10/956,768

(22) Filed: Sep. 30, 2004

(65) Prior Publication Data

US 2006/0073877 A1 Apr. 6, 2006

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/25; 463/17; 463/20; 463/21; 273/138.1; 273/143 R; 273/273; 273/292

(58) Field of Classification Search .................. 463/16, 463/17, 18, 19, 20, 21, 25; 273/138.1, 139, 273/143 R, 292
See application file for complete search history.

(56) References Cited

U.S. PATENT DOCUMENTS

| | | | |
|---|---|---|---|
| 1,527,929 | A | 2/1925 | Simons |
| 3,642,287 | A | 2/1972 | Lally et al. |
| 4,182,515 | A | 1/1980 | Nemeth |
| 4,448,419 | A | 5/1984 | Telnaes |
| 4,508,357 | A | 4/1985 | Reich |
| 4,560,161 | A | 12/1985 | Hamano |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,743,022 | A | 5/1988 | Wood |
| 4,775,155 | A | 10/1988 | Lees |
| 4,874,173 | A | 10/1989 | Kishishita |
| 4,991,848 | A | 2/1991 | Greenwood et al. |
| 5,046,737 | A | 9/1991 | Fienberg |
| 5,116,055 | A | 5/1992 | Tracy |

(Continued)

FOREIGN PATENT DOCUMENTS

EP 0 688 002 A1 12/1995

(Continued)

OTHER PUBLICATIONS

Battleship Advertisement, printed from www.mikohn.com (website) on Apr. 25, 2001.

(Continued)

*Primary Examiner*—John M. Hotaling, II
*Assistant Examiner*—Paul A. D'Agostino
(74) *Attorney, Agent, or Firm*—K & L Gates LLP

(57) ABSTRACT

A gaming device having an accumulation game with changing selections. The gaming device generates or picks, one at a time, a plurality of selections. Each generated selection is accumulated or marked and then changed to another selection. The gaming device continues generating selections, accumulating the generated selections and changing the generated selections until at least one selection is generated and accumulated a designated number of times. When at least one selection is generated and accumulated the designated number of times, an award is provided to the player wherein the award is based on the selection which was generated and accumulated the designated number of times.

63 Claims, 11 Drawing Sheets

U.S. PATENT DOCUMENTS 5,152,529 A 10/1992 Okada
5,178,390 A 1/1993 Okada
5,205,555 A 4/1993 Hamano
5,263,716 A * 11/1993 Smyth ........................ 463/21
5,322,295 A 6/1994 Cabot et al.
5,332,228 A 7/1994 Schultz
5,342,047 A 8/1994 Heidel et al.
5,344,144 A 9/1994 Canon
5,360,214 A * 11/1994 Harmen .................. 273/144 B
5,380,007 A 1/1995 Travis et al.
5,423,539 A 6/1995 Nagao
5,431,408 A 7/1995 Adams
5,437,451 A 8/1995 Fulton
5,449,173 A 9/1995 Thomas et al.
5,456,465 A 10/1995 Durham
5,524,888 A 6/1996 Heidel
5,536,016 A 7/1996 Thompson
5,542,669 A 8/1996 Charron et al.
5,630,753 A * 5/1997 Fuchs ............................ 463/9
5,647,798 A 7/1997 Falciglia
5,722,891 A 3/1998 Inoue
5,743,524 A 4/1998 Nannicola
5,769,716 A 6/1998 Saffari et al.
5,772,509 A 6/1998 Weiss
5,788,573 A 8/1998 Baerlocher et al.
5,823,873 A 10/1998 Moody
5,823,874 A 10/1998 Adams
5,833,536 A 11/1998 Davids et al.
5,848,932 A 12/1998 Adams
5,851,148 A 12/1998 Brune et al.
5,855,514 A 1/1999 Kamille
5,873,781 A 2/1999 Keane
5,882,261 A 3/1999 Adams
5,902,184 A 5/1999 Bennett
5,911,418 A 6/1999 Adams
5,919,088 A 7/1999 Weiss
5,927,714 A 7/1999 Kaplan
5,938,200 A 8/1999 Markowicz et al.
5,947,820 A 9/1999 Morro et al.
5,951,397 A 9/1999 Dickinson
5,976,015 A 11/1999 Seelig et al.
5,980,384 A 11/1999 Barrie
5,997,400 A 12/1999 Seelig et al.
5,997,401 A 12/1999 Crawford
6,004,207 A 12/1999 Wilson, Jr. et al.
6,015,346 A 1/2000 Bennett
6,033,307 A 3/2000 Vancura
6,056,642 A 5/2000 Bennett
6,059,658 A * 5/2000 Mangano et al. .............. 463/16
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,113,098 A 9/2000 Adams
6,120,031 A 9/2000 Adams
6,120,378 A 9/2000 Moody
6,126,542 A 10/2000 Fier
6,135,882 A 10/2000 Kadlic
6,135,885 A 10/2000 Lermusiaux
6,146,271 A 11/2000 Kadlic
6,146,273 A 11/2000 Olsen
6,149,156 A 11/2000 Feola
6,149,157 A 11/2000 Suan
6,155,925 A 12/2000 Giobbi et al.
6,159,095 A 12/2000 Frohm et al.
6,159,097 A 12/2000 Gura
6,159,098 A * 12/2000 Slomiany et al. .............. 463/25
6,162,121 A 12/2000 Morro et al.
6,164,652 A 12/2000 Lauretta et al.
6,165,070 A 12/2000 Nolte et al.
6,168,520 B1 1/2001 Baerlocher et al.
6,168,523 B1 1/2001 Piechowiak et al.
6,173,955 B1 1/2001 Perrie et al.
6,174,235 B1 1/2001 Walker et al.
6,190,254 B1 2/2001 Bennett
6,190,255 B1 2/2001 Thomas et al.
6,203,429 B1 3/2001 Demar et al.
6,217,022 B1 * 4/2001 Astaneha ................ 273/138.1
6,224,482 B1 5/2001 Bennett
6,224,483 B1 5/2001 Mayeroff
6,231,442 B1 5/2001 Mayeroff
6,234,897 B1 5/2001 Frohm et al.
6,251,013 B1 * 6/2001 Bennett ....................... 463/13
6,254,481 B1 7/2001 Jaffe
6,261,177 B1 7/2001 Bennett
6,299,165 B1 10/2001 Nagano
6,302,790 B1 10/2001 Brossard
6,309,299 B1 10/2001 Weiss
6,309,300 B1 10/2001 Glavich
6,312,334 B1 11/2001 Yoseloff
6,315,660 B1 11/2001 DeMar et al.
6,315,664 B1 11/2001 Baerlocher et al.
6,319,124 B1 11/2001 Baerlocher et al.
6,322,309 B1 11/2001 Thomas et al.
6,343,988 B1 2/2002 Walker et al.
6,346,043 B1 * 2/2002 Colin et al. .................. 463/17
6,347,996 B1 2/2002 Gilmore et al.
6,364,766 B1 4/2002 Anderson et al.
6,364,767 B1 4/2002 Brossard et al.
6,368,218 B2 4/2002 Angell, Jr.
6,375,187 B1 4/2002 Baerlocher et al.
6,398,644 B1 6/2002 Perrie et al.
6,406,369 B1 6/2002 Baerlocher et al.
6,413,160 B1 7/2002 Vancura
6,413,161 B1 7/2002 Baerlocher et al.
6,416,406 B1 * 7/2002 Duhamel ..................... 463/12
6,425,824 B1 7/2002 Baerlocher et al.
6,428,412 B1 8/2002 Anderson et al.
6,439,995 B1 8/2002 Hughs-Baird et al.
6,443,837 B1 9/2002 Jaffe et al.
6,464,582 B1 10/2002 Baerlocher et al.
6,494,785 B1 12/2002 Gerrard et al.
6,506,117 B2 1/2003 DeMar et al.
6,506,118 B1 1/2003 Baerlocher et al.
6,514,141 B1 2/2003 Kaminkow et al.
6,561,900 B1 * 5/2003 Baerlocher et al. ............ 463/20
6,565,433 B1 * 5/2003 Baerlocher et al. ............ 463/20
6,572,472 B1 6/2003 Glavich
6,575,830 B2 * 6/2003 Baerlocher et al. ............ 463/20
6,582,307 B2 6/2003 Webb
6,585,591 B1 7/2003 Baerlocher et al.
6,592,457 B1 7/2003 Frohm et al.
6,599,185 B1 7/2003 Kaminkow et al.
6,602,136 B1 * 8/2003 Baerlocher et al. ............ 463/16
6,602,137 B2 * 8/2003 Kaminkow et al. ........... 463/16
6,604,740 B1 8/2003 Singer et al.
6,604,974 B2 8/2003 Doty et al.
6,609,971 B2 8/2003 Vancura
6,616,142 B2 9/2003 Adams
6,632,141 B2 10/2003 Webb et al.
6,634,943 B1 10/2003 Baerlocher
6,644,664 B2 * 11/2003 Muir et al. .................. 273/146
6,676,516 B2 1/2004 Baerlocher et al.
6,682,073 B2 * 1/2004 Bryant et al. ............ 273/138.1
6,685,561 B2 2/2004 Anderson et al.
6,688,975 B2 2/2004 Baerlocher et al.
6,722,982 B2 4/2004 Kaminkow et al.
6,722,983 B2 4/2004 Kaminkow et al.
6,731,313 B1 * 5/2004 Kaminkow ................. 715/839
6,733,386 B2 5/2004 Cuddy et al.
6,796,900 B2 * 9/2004 Baerlocher et al. ............ 463/16
6,802,775 B2 10/2004 Baerlocher et al.
6,817,944 B2 11/2004 Kaminkow et al.

| | | | | | |
|---|---|---|---|---|---|
| 6,878,061 | B2 * | 4/2005 | Baerlocher et al. | 463/16 |
| 6,908,383 | B2 * | 6/2005 | Baerlocher et al. | 463/20 |
| 6,910,962 | B2 * | 6/2005 | Marks et al. | 463/16 |
| 6,918,832 | B2 * | 7/2005 | Baerlocher et al. | 463/20 |
| 6,929,952 | B2 * | 8/2005 | Baerlocher | 436/16 |
| 6,955,600 | B2 * | 10/2005 | Glavich et al. | 463/20 |
| 6,958,013 | B2 * | 10/2005 | Miereau et al. | 463/16 |
| 6,971,955 | B2 * | 12/2005 | Baerlocher et al. | 463/20 |
| 7,014,559 | B1 * | 3/2006 | Fong | 463/20 |
| 7,070,503 | B2 * | 7/2006 | Rudolph | 463/20 |
| 7,077,745 | B2 * | 7/2006 | Gomez et al. | 463/20 |
| 2001/0054794 | A1 | 12/2001 | Cole et al. | |
| 2002/0025844 | A1 | 2/2002 | Casey et al. | |
| 2002/0037764 | A1 | 3/2002 | Anderson et al. | |
| 2002/0049084 | A1 | 4/2002 | Hughes-Baird et al. | |
| 2002/0072402 | A1 | 6/2002 | Baerlocher | |
| 2002/0142821 | A1 | 10/2002 | Baerlocher | |
| 2002/0142822 | A1 | 10/2002 | Baerlocher et al. | |
| 2002/0151350 | A1 | 10/2002 | Baerlocher et al. | |
| 2002/0151351 | A1 | 10/2002 | Baerlocher et al. | |
| 2002/0155883 | A1 | 10/2002 | Baerlocher | |
| 2002/0183109 | A1 | 12/2002 | McGahn et al. | |
| 2002/0198036 | A1 | 12/2002 | Baerlocher et al. | |
| 2003/0027623 | A1 | 2/2003 | Rose | |
| 2003/0040358 | A1 | 2/2003 | Rothkranz et al. | |
| 2003/0040360 | A1 | 2/2003 | Kaminkow | |
| 2003/0045348 | A1 | 3/2003 | Palmer et al. | |
| 2003/0045350 | A1 | 3/2003 | Baerlocher et al. | |
| 2003/0060259 | A1 * | 3/2003 | Mierau et al. | 463/16 |
| 2003/0060260 | A1 | 3/2003 | Gerrard et al. | |
| 2003/0060272 | A1 * | 3/2003 | Glavich et al. | 463/25 |
| 2003/0064795 | A1 | 4/2003 | Baerlocher et al. | |
| 2003/0078093 | A1 | 4/2003 | Simms et al. | |
| 2003/0078096 | A1 | 4/2003 | Kaminkow et al. | |
| 2003/0087693 | A1 | 5/2003 | Baerlocher et al. | |
| 2003/0119583 | A1 | 6/2003 | Kaminkow et al. | |
| 2003/0157982 | A1 | 8/2003 | Gerrard et al. | |
| 2003/0162578 | A1 | 8/2003 | Baerlocher et al. | |
| 2003/0162579 | A1 | 8/2003 | Gauselmann | |
| 2003/0162584 | A1 | 8/2003 | Hughs-Baird et al. | |
| 2003/0195027 | A1 | 10/2003 | Baerlocher et al. | |
| 2003/0195028 | A1 * | 10/2003 | Glavich | 463/16 |
| 2004/0023708 | A1 | 2/2004 | Kaminkow et al. | |
| 2004/0053669 | A1 | 3/2004 | Gerrard et al. | |
| 2004/0063493 | A1 | 4/2004 | Baerlocher et al. | |
| 2004/0072613 | A1 * | 4/2004 | Visocnik | 463/25 |
| 2004/0082378 | A1 * | 4/2004 | Peterson et al. | 463/20 |
| 2004/0121836 | A1 * | 6/2004 | Rudolph | 463/20 |
| 2006/0073873 | A1 * | 4/2006 | Rodgers et al. | 463/20 |
| 2006/0252488 | A1 * | 11/2006 | Lalonde et al. | 463/17 |

FOREIGN PATENT DOCUMENTS

| | | | |
|---|---|---|---|
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| GB | 2 144 644 | | 8/1983 |
| GB | 2 242 300 | | 9/1991 |
| GB | 2 248 403 | | 4/1992 |
| GB | 2 262 642 | | 6/1993 |
| WO | WO 97/32285 | | 9/1997 |
| WO | WO 00/12186 | | 3/2000 |
| WO | WO 00/66235 | | 11/2000 |
| WO | WO 00/76606 | | 12/2000 |
| WO | WO 01/19476 | | 3/2001 |

OTHER PUBLICATIONS

Battleship Article, written by Strictly Slots, published in 2000.
Bingo Advertisement, written by Casino Data System, published 1998.
Break the Spell Advertisement, written by Atronic Casino Technology, published in 1999.
Break the Spell Article, written by Strictly Slots, published in 2000.
Crazy Fruits Article, written by Atronic, published 2001.
Enchanted Forest Advertisement, written by Aristocrat, Inc., published in 1995.
Enchanted Unicorn Advertisement, written by IGT, published in 2001.
Enchanted Unicorn-Unicorn Bonus Advertisements, written by IGT, published 2001.
Evil Kneivel Advertisement, written by IGT, published 2001.
Five Card Instant Bingo Advertisement, written by IGT, published 2000.
Fortune Cookie Advertisement, written by IGT, published 2000.
Jackpot Party Brochures and Articles, written by WMS Gaming, Inc., published in 1998.
Money to Burn Advertisement, written by WMS Gaming, Inc., undated.
Piggy Banking and Big Bang Piggy Banking Advertisements, written by WMS Gaming, Inc., published prior to 2004.
Price is Right Showcase Showdown, printed from www.schuminweb.com (website) on Mar. 16, 2001.
Regis Cash Club Advertisement, written by IGT, published 2000.
South Park Advertisement written by IGT, published in 2000.
Stooges II Article written by Strictly Slots, published in Jun. 2001.
Texas Tea Advertisement, written by IGT, published 2000.
Top Dollar Brochure, written by IGT, published in 1998.
Wheel of Fortune Advertisements, written by IGT, published in 1998, 1999 and 2002.

* cited by examiner

GAMING DEVICE HAVING ACCUMULATION GAME WITH CHANGING SELECTIONS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming devices having bonus games generally employ a triggering event that occurs during the base game. The triggering event temporarily stalls or halts the base game play and enables a player to enter a second, different game, which is the bonus game. The player plays the bonus game, likely receives an award and returns to the base game.

In the game disclosed in U.S. Pat. No. 6,224,483, a player spins a wheel including several awards. The number of spins of the wheel provided to the player is based on the number of paylines that the player played in the primary game, the number of credits wagered on the paylines or a specific symbol or symbol combination is generated on the reels in the primary game. In this game, the player spins the wheel and obtains a single award, such as between twenty-five and one-thousand credits in each spin. The bonus game ends when the player has no spins remaining and the player receives the total accumulated award from the bonus game.

Gaming devices that increase the opportunities to obtain awards and increase the size of the awards are desirable. Players are attracted to games that provide several larger awards and the opportunity to obtain a large award. Therefore, to increase player enjoyment and excitement, it is desirable to provide new games for gaming devices.

SUMMARY OF THE INVENTION

The present invention relates in general to a gaming device, and more particularly to a gaming device having an accumulation game with changing selections. In one embodiment, the gaming device generates or picks, one at a time, a plurality of selections. Each generated selection is accumulated or marked and then changed or replaced to another selection. The change or replacement remains in effect for one, more or all of the subsequent generations. The gaming device continues generating selections, accumulating the generated selections and changing the generated selections until at least one selection is generated and accumulated a designated number of times. When at least one selection is generated and accumulated the designated number of times, an award is provided to the player wherein the award is based on the selection which was generated and accumulated the designated number of times.

In one embodiment, the gaming device provides at least one selection generator or symbol generator which is adapted to generate one or more of a plurality of selections. Each selection is associated with an award, such as a value or multiplier. In one embodiment, the selection generator is a wheel with a plurality of sections. In this embodiment, a plurality of the selections are initially associated with one or more of the sections of the wheel. In another embodiment, each of the selections is initially associated with one or more of the sections of the wheel.

In one embodiment, the gaming device also includes at least one and preferably a plurality of displayed accumulation meters or tracking sets. Each accumulation meter is associated with at least one of the plurality of selections. In this embodiment, the tracking sets or accumulation meters are adapted to monitor and display the number of times each selection is generated and accumulated.

In one embodiment, upon a suitable triggering event, the selection generator is activated to indicate, generate or pick one of the plurality of selections. The generated selection is accumulated, marked or tracked and the accumulation meter associated with the generated selection displays the accumulation of the generated selection. For example, the wheel spins to indicate one of the sections and display any selection associated with the indicted section. In this example, the accumulation meter associated with the displayed selection is incremented by one to reflect the generation of that selection.

After accumulating the generated selection, the gaming device determines if any of the selections have been generated and accumulated a designated number of times. If at least one of the selections has been generated or indicated the designated number of times, the award associated with that selection is provided to the player and the game ends.

If at least one of the selections has not been generated and accumulated the designated number of times, the gaming device replaces or changes the generated selection. In one embodiment, the replacement or change includes the gaming device replacing the generated selection with another designated selection. In one embodiment, the replacement selection (i.e., the selection which replaces the generated selection) is the same designated selection for each replacement. In another embodiment, for each replacement or change, the replacement selection is a randomly determined selection. In one embodiment, the replacement of the generated selection with the replacement selection remains for one, more or each of the any subsequent generations of the selection generator.

For example, if the selection generator is a wheel, the gaming device reassociates the selection associated with the indicated section of the wheel with another, designated selection. That is, if the selection generator indicates a red colored selection (i.e., a red colored selection is displayed as associated with the indicated section of the selection generator), the gaming device is operable to change the indicated red colored selection to a purple colored selection (i.e., the purple colored selection is reassociated with the indicated section of the selection generator). It should be appreciated that the section of the wheel is not changed or replaced, but rather the displayed selection associated with the indicated section is changed or replaced.

As each generated selection is replaced with another replacement selection, the respective probabilities of the different selections being generated by the selection generator are changed. In one embodiment, each selection initially has an equal probability of being generated. In this embodiment, when one selection is replaced, the generated selection has a lower changed probability of being subsequently generated by the selection generator and the replacement generator has a higher changed probability of being subsequently generated by the selection generator. In another embodiment, a plurality of or each selection has a different weighted probability of being generated. It should be appreciated that while the probability of each selection being generated changes after a replacement, the probability of each section of the wheel does not change after a replacement. For example, if one section of the wheel is associated with a probability of being indicated, then after that section is generated and the displayed selection associated with that section changes (thus changing the probability of that displayed selection being regenerated), the probability associated with the indicated section remains the same.

In one embodiment, the same selection is chosen to replace each of the generated selections. In another embodiment, different selections are chosen to replace a plurality or each of the generated selections. In another embodiment, one selection is designated to replace one type of generated selection and another selection is designated to replace another type of generated selection. In another embodiment, the replacement selection is one of the selections initially associated with one of the sections of the selection generator wheel. In another embodiment, the replacement selection is not one of the selections initially associated with one of the sections of the selection generator wheel.

After changing the generated selection, the gaming device generates or picks another one of the plurality of selections. The gaming device marks or accumulates the generated selection and determines if any of the selections have been generated and accumulated the designated number of times. This process continues as described above until at least one selection is generated and accumulated the designated number of times, the award associated with that selection is provided to the player and the game ends.

Thus, it should be appreciated that one embodiment, the present invention provides a gaming device operated under control of a processor, the gaming device including a game controlled by the processor, a plurality of awards in the game and a plurality of selections in the game wherein each of the selections is associated with one of the awards. The gaming device also includes a selection generator adapted to generate the plurality of selections and a display device operable to display the game. The processor is operable with the display device and the selection generator to control a play of the game by (a) generating one of the selections, (b) accumulating the generated selection and (c) determining if any of the selections have been accumulated a designated number of times. If none of the selections have been accumulated the designated number of times, the processor is operable to control the play of the game by: (i) replacing the generated selection with another one of the plurality of selections and (ii) repeating (a) to (c) at least once. If at least one of the selections has been accumulated the designated number of times, the processor is operable to control the play of the game by providing a player the award associated with the selection accumulated the designated number of times.

In another embodiment, the present invention provides a gaming device operated under control of a processor, the gaming device including a game controlled by the processor, a plurality of awards in the game and a plurality of symbols in the game wherein each of the symbols is associated with one of the awards. The gaming device also includes a symbol generator adapted to generate the plurality of symbols, a plurality of accumulation meters in the game wherein each of the accumulation meters is associated with a different one of the symbols and a display device operable to display the game. The processor is operable with the display device and the symbol generator to control a play of the game by (a) generating one of the symbols, (b) incrementing the accumulation meter associated with the generated symbol and (c) determining if any of the accumulation meters have been incremented a predetermined number of times. If none of the accumulation meters have been incremented the predetermined number of times, the processor is operable to control the play of the game by (i) replacing the generated symbol with another one of the plurality of symbols and (ii) repeating (a) to (c) at least once. If at least one of the accumulation meters has been incremented the predetermined number of times, the processor is operable to control the play of the game by providing a player the award associated with the symbol associated with the accumulation meter incremented the predetermined number of times.

In another embodiment, the present invention provides a method of operating a gaming device, the method including (a) generating one of a plurality selections, wherein each of the selections is associated with one of a plurality of awards, (b) accumulating the generated selection and (c) determining if any of the selections have been accumulated a designated number of times. If none of the selections have been accumulated the designated number of times, the method includes (i) replacing the generated selection with another one of the plurality of selections and (ii) repeating (a) to (c) at least once. If at least one of the selections has been accumulated the designated number of times, the method includes providing a player the award associated with the selection accumulated the designated number of times.

In another embodiment, the present invention provides a method of operating a gaming device, the method including (a) generating one of a plurality of symbols, wherein each of the symbols is associated with one of a plurality of awards, (b) incrementing an accumulation meter associated with the generated symbol wherein the incremented accumulation meter is one of a plurality of accumulation meters and each of the accumulation meters is associated with a different one of the symbols and (c) determining if any of the accumulation meters have been incremented a predetermined number of times. If none of the accumulation meters have been incremented the predetermined number of times, the method includes (i) replacing the generated symbol with another one of the plurality of symbols and (ii) repeating (a) to (c) at least once. If at least one of the accumulation meters has been incremented the predetermined number of times, the method includes providing a player the award associated with the symbol associated with the accumulation meter incremented the predetermined number of times.

It should be appreciated that the present invention provides an accumulation game with changing selections. Changing the available selections during an accumulation game provides increased excitement and enjoyment for the player.

Additional features and advantages of the present invention are described in, and will be apparent from, the following Detailed Description of the Invention and the figures.

DETAILED DESCRIPTION OF THE INVENTION

Figure 1A:
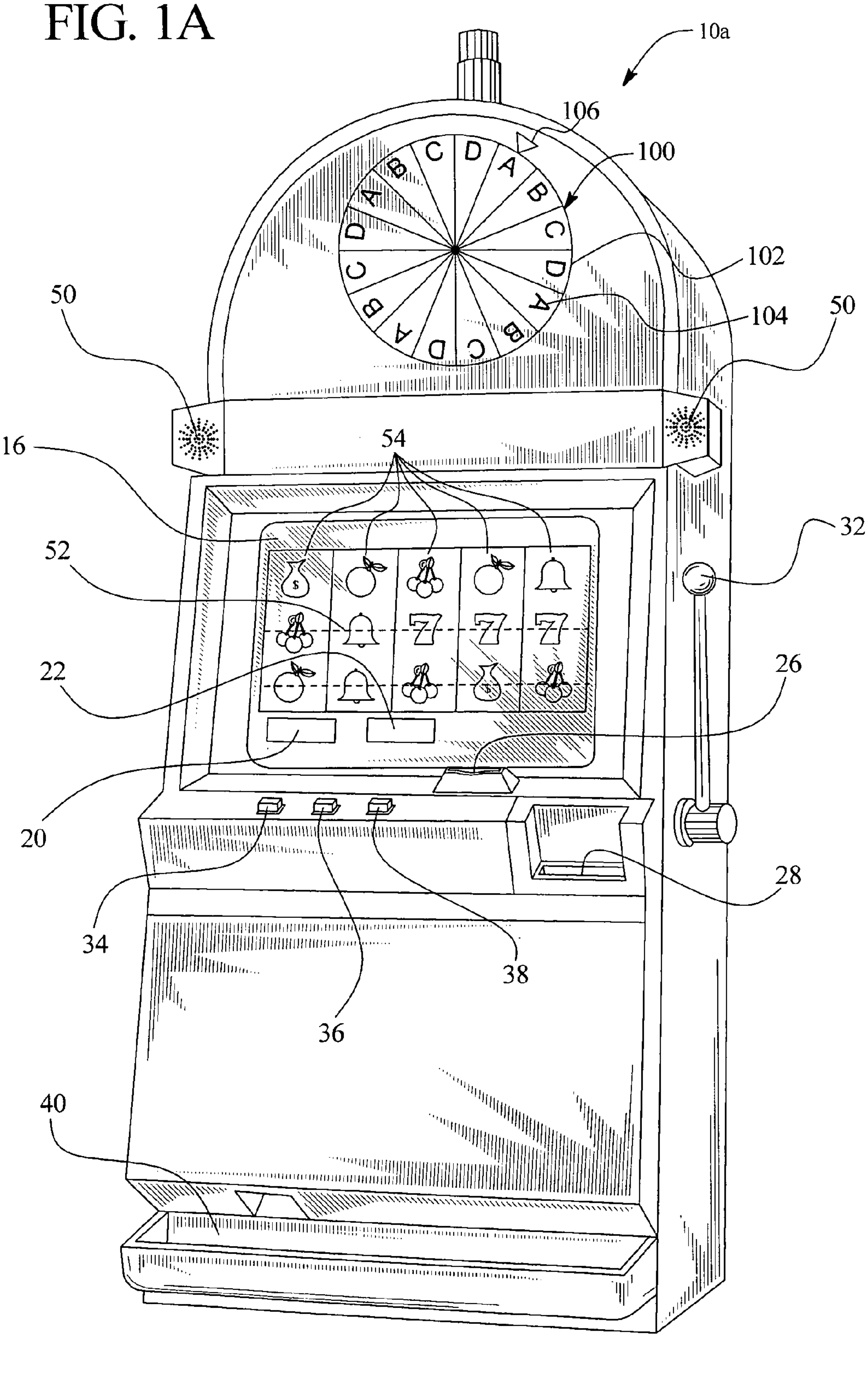
FIG. 1A is a front-side perspective view of one embodiment of the gaming device of the present invention.
Figure 1B:
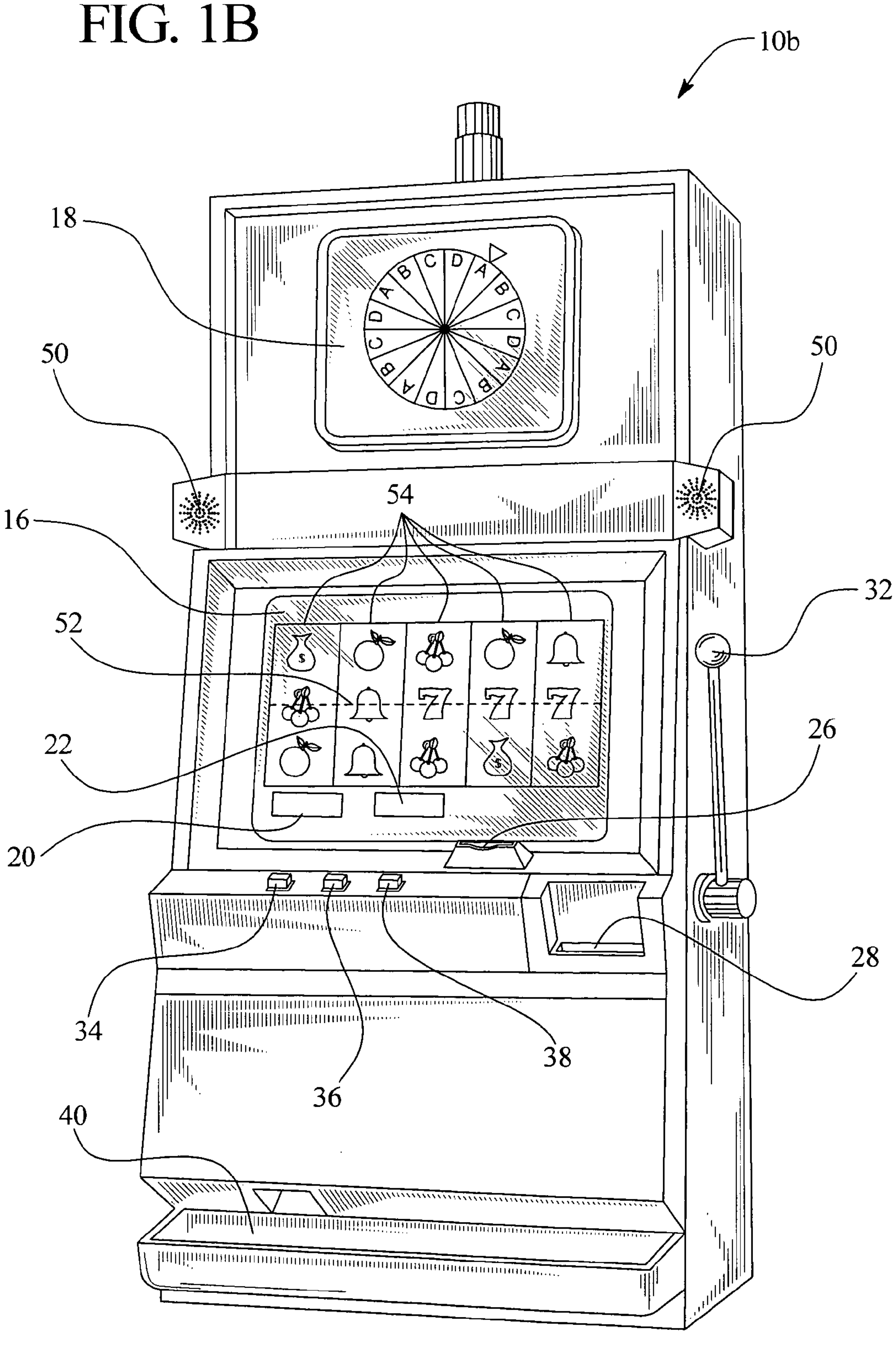
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
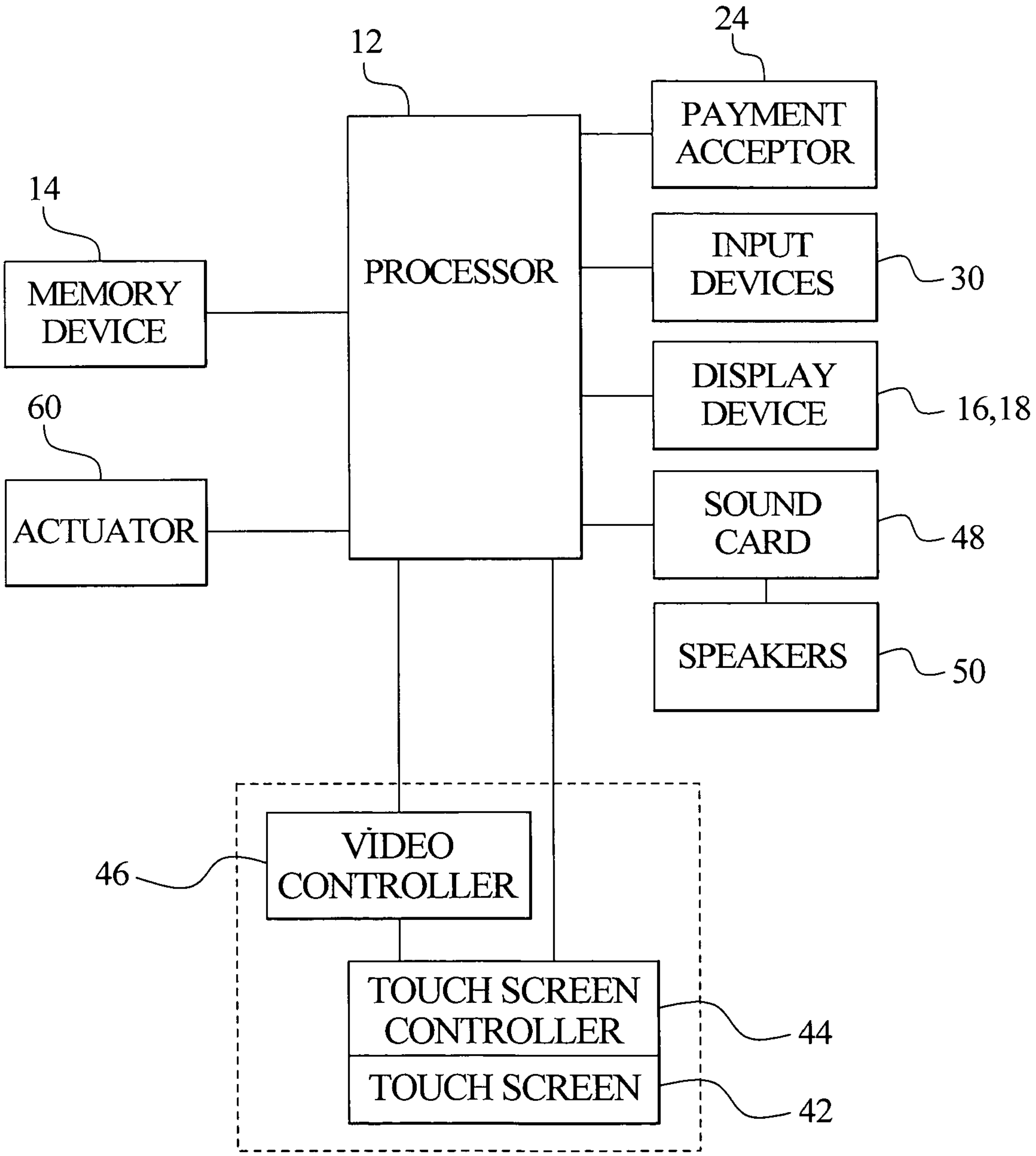
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels or symbol generators, such as wheels, dynamic lighting, video images and images of people, characters, places, things and faces of cards, tournament advertisements, promotions and the like.

In one embodiment, as illustrated in FIG. 1A, the gaming device includes at least one electromechanical selection or symbol generators 100, such as a rotatable wheel, reel, die which is attached to the housing of the gaming device. In one embodiment wherein the selection generator is a rotatable wheel, the selection generator includes a plurality of sections 102 each with an associated symbol 104. As illustrated in FIG. 2A, the mechanical selection generator is associated with and connected to a suitable actuator or motor 60 which is controlled by the processor. The associated actuator or motor is adapted to drive or rotate the selection generator, such as the rotatable wheel in a clockwise or counter-clockwise direction. In an alternative embodiment, any suitable electromechanical device which preferably moves one or more interacting objects, such as one or more reels or dice, which are configured to display at least one and preferably a plurality of games or other suitable images, symbols or indicia may be employed with the present invention.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
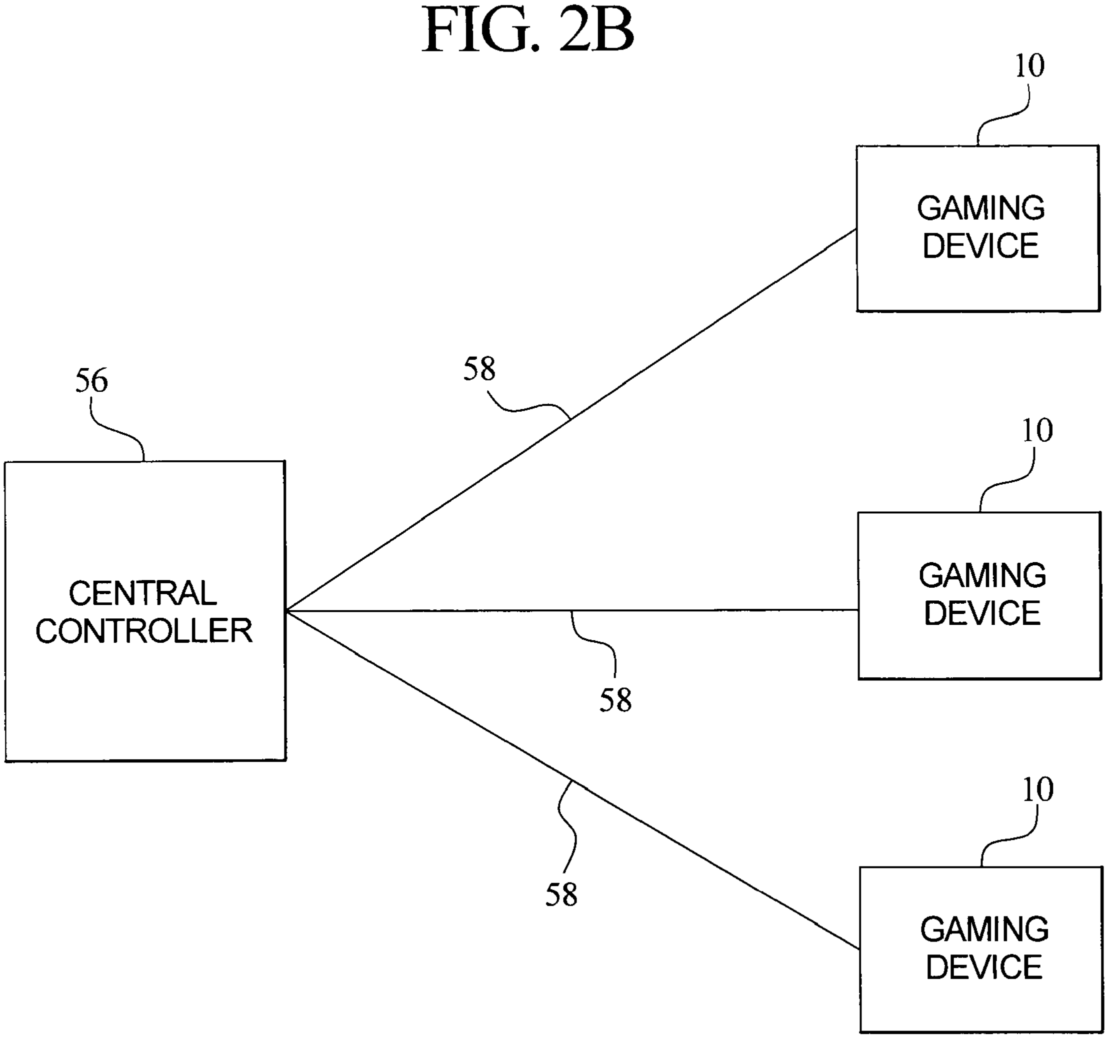
FIG. 2B is a schematic block diagram illustrating a plurality of gaming terminals in communication with a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Accumulation Game

Figure 3A:
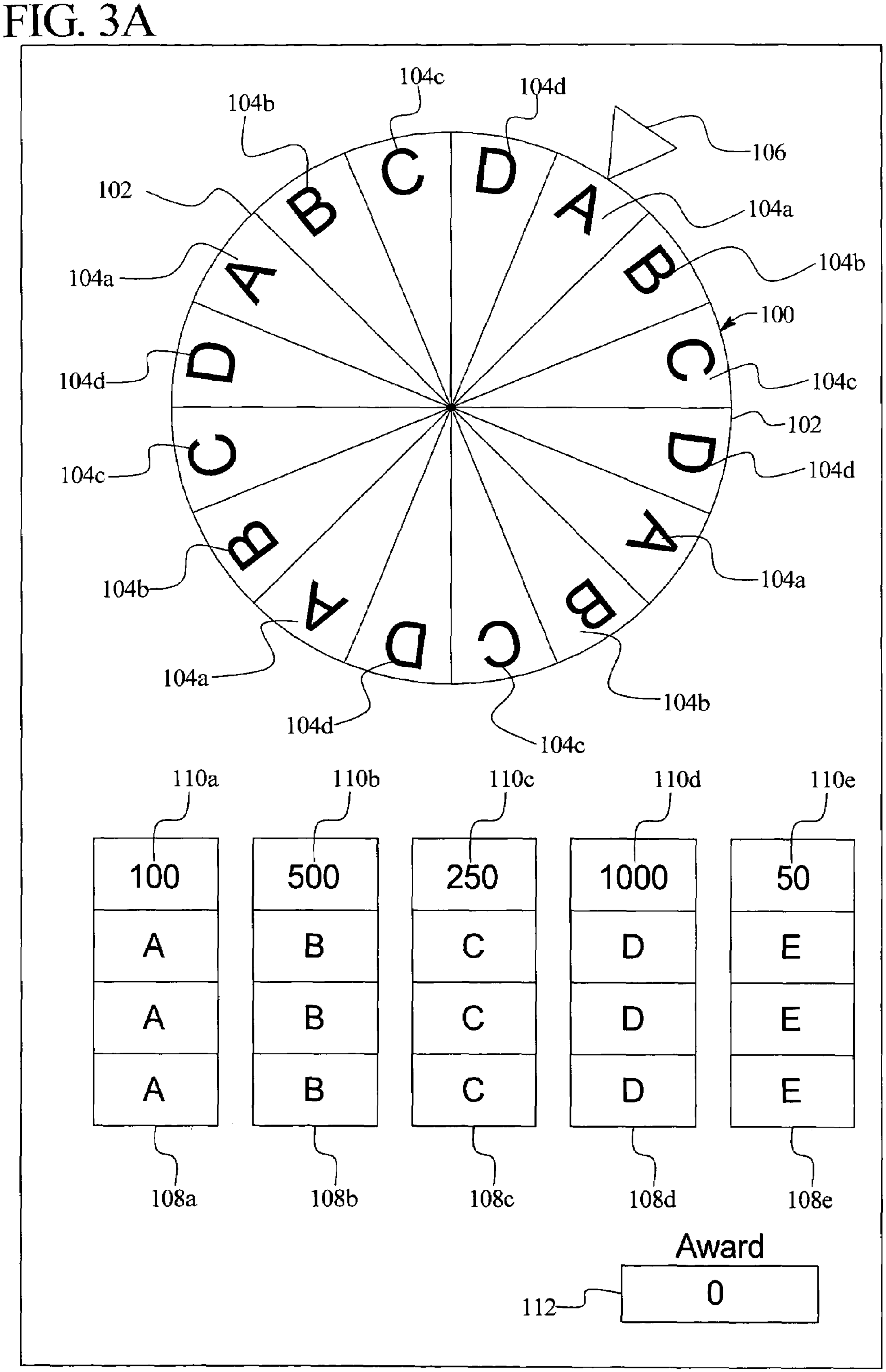
FIGS. 3A, 3B, 3C, 3D, 3E, 3F and 3G are front elevational views of one embodiment of the present invention illustrating a plurality of selections picked and subsequently changed to determine an award to be provided to a player.
Figure 3B:
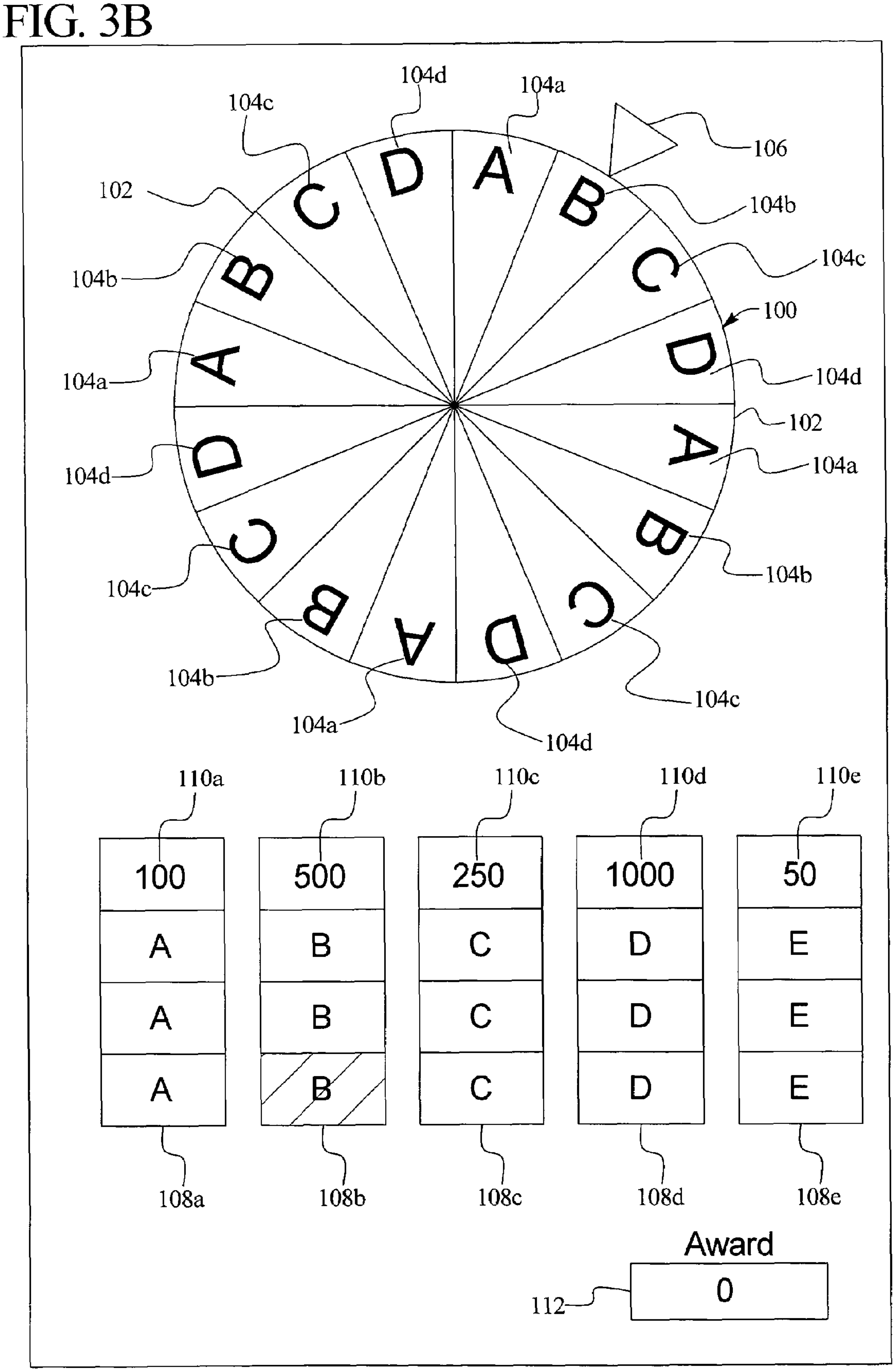
Figure 3C:
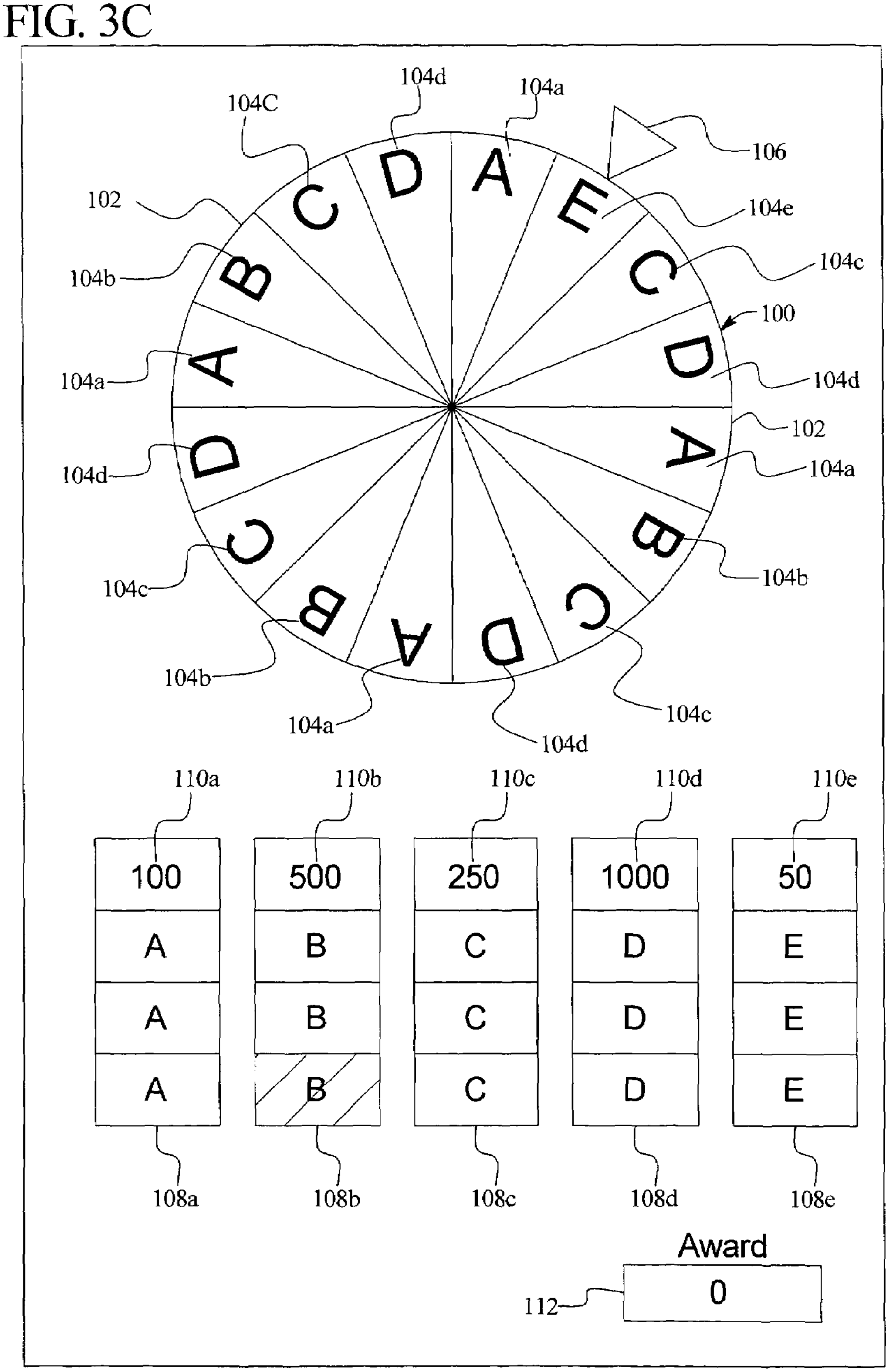
Figure 3D:
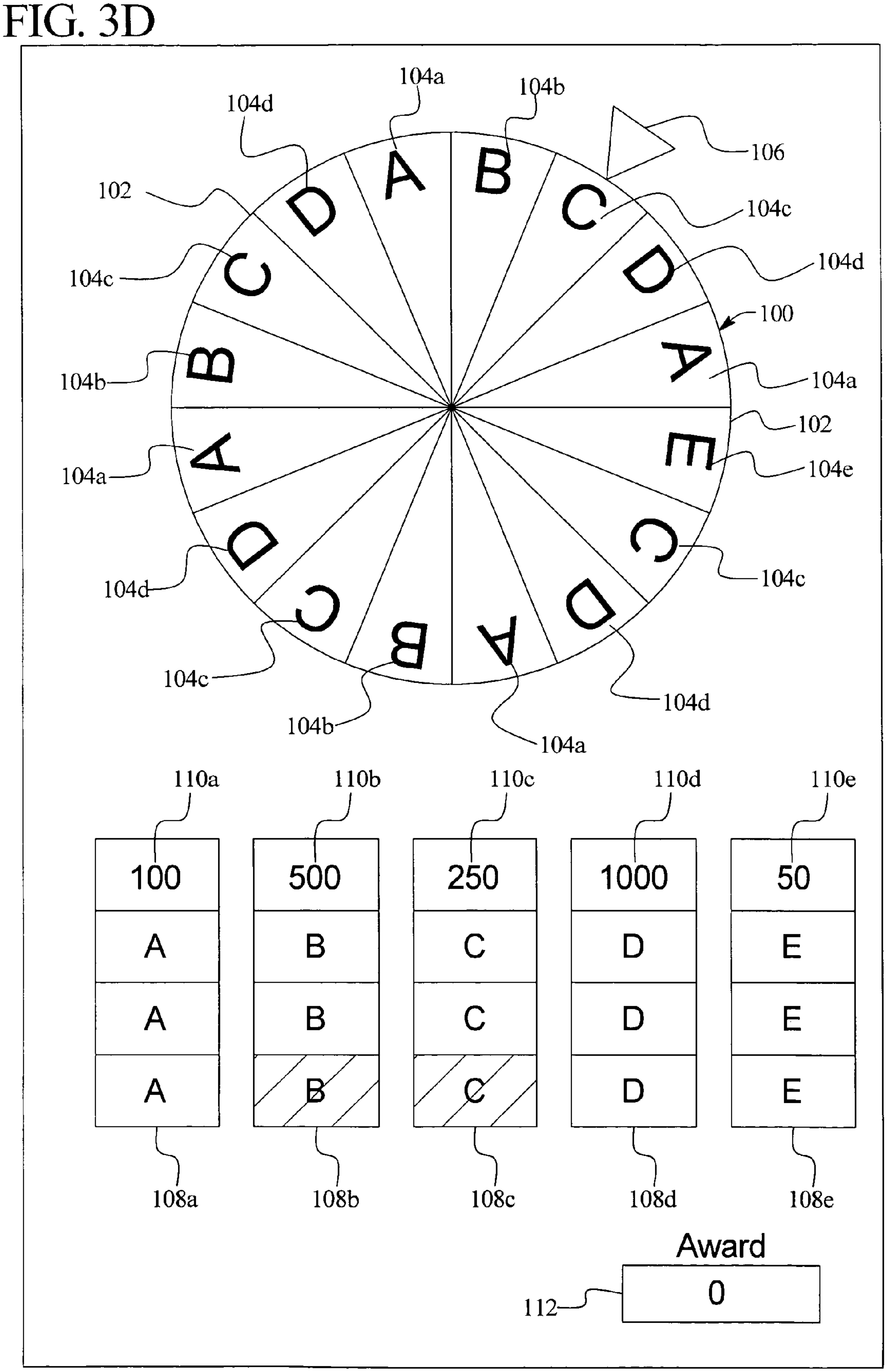
Figure 3E:
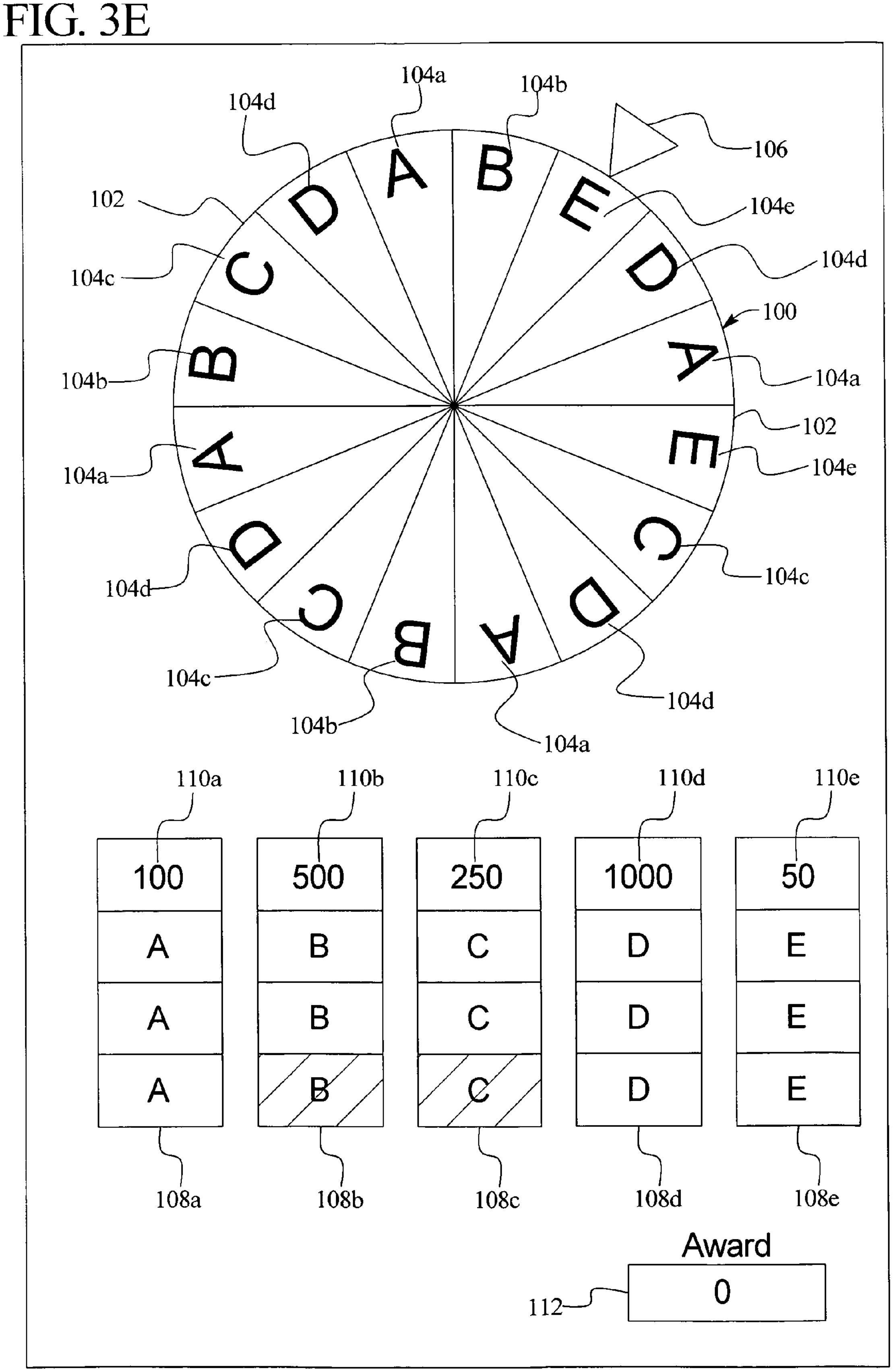
Figure 3F:
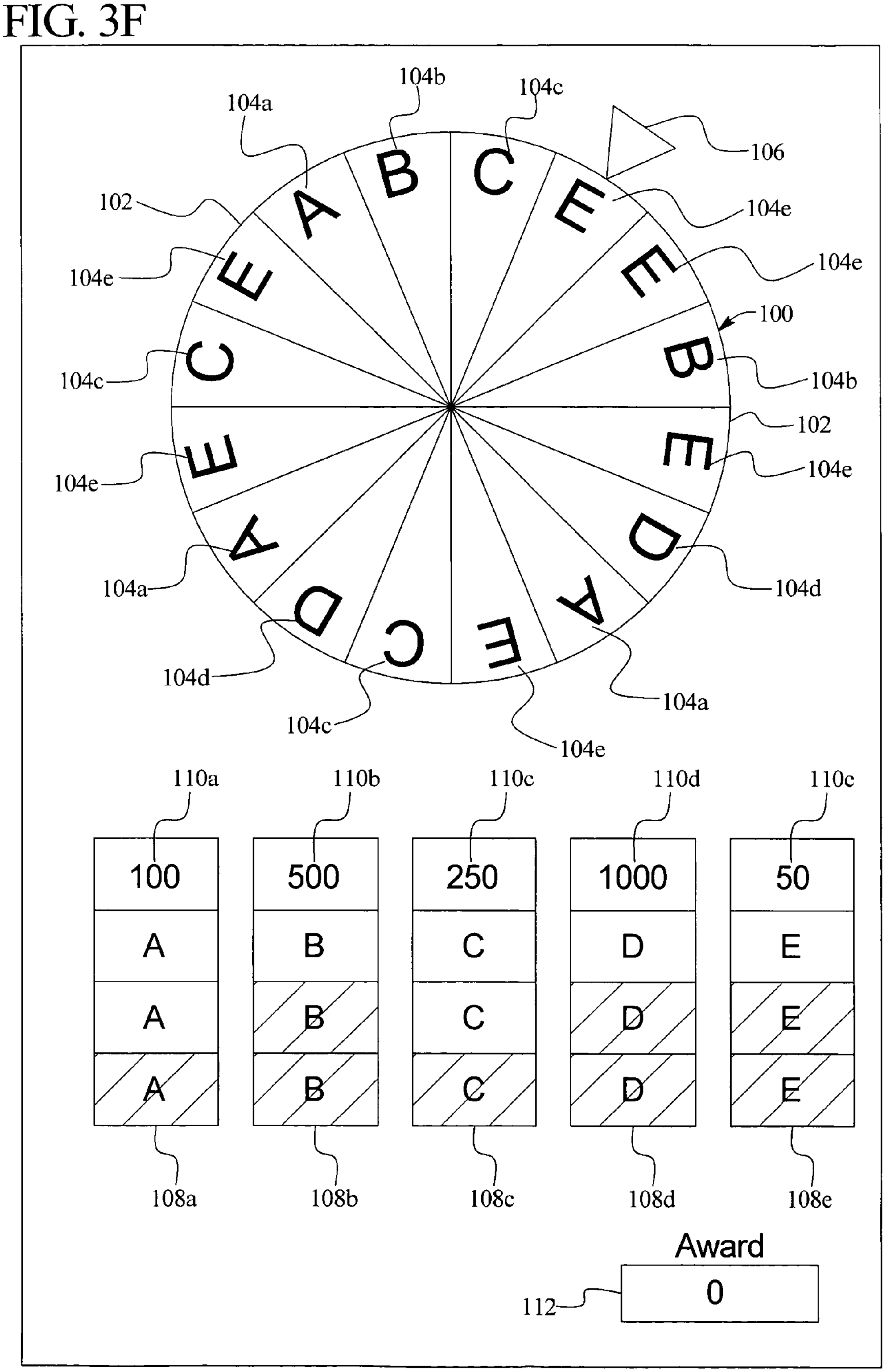
Figure 3G:
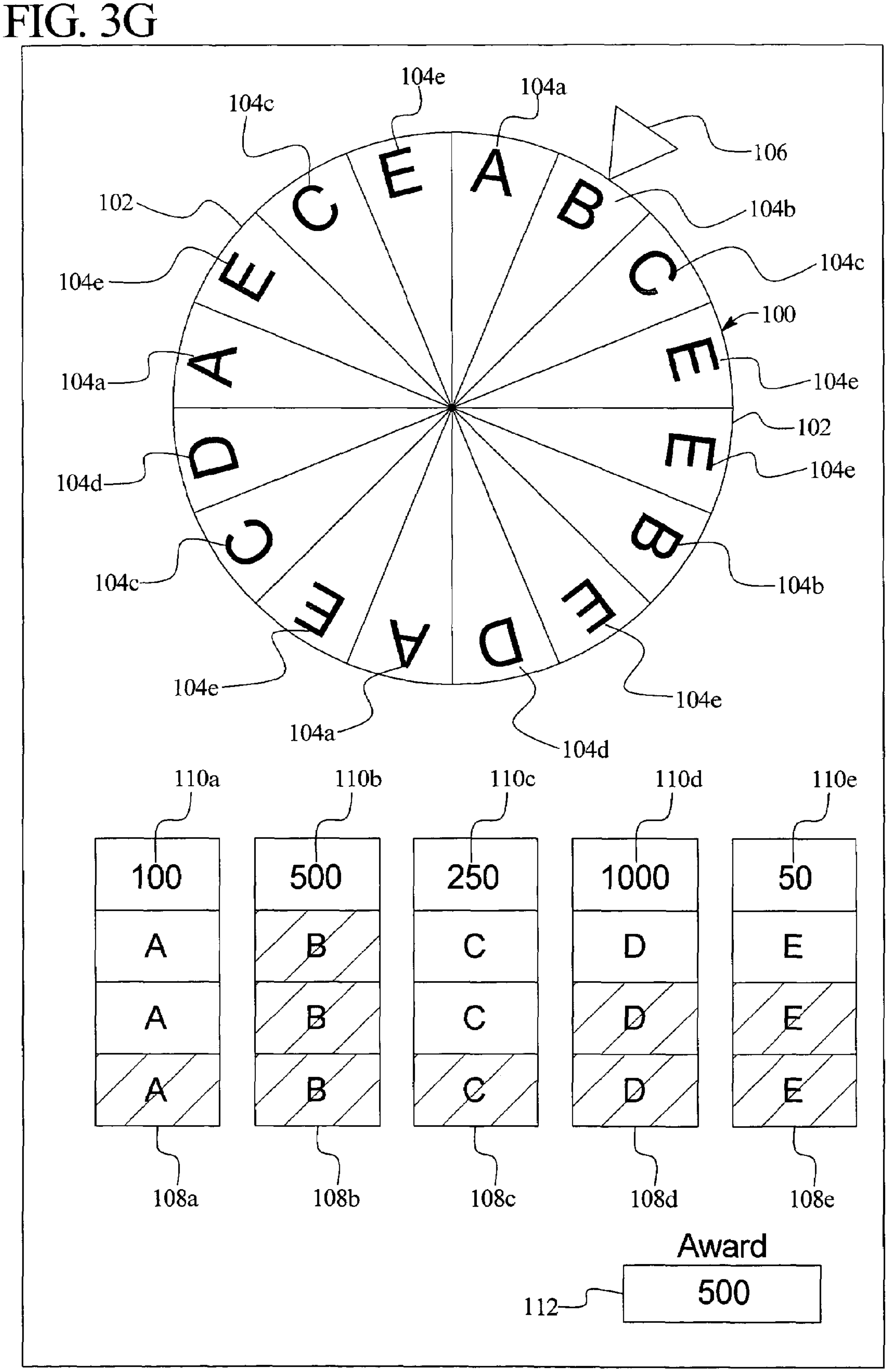

Referring generally to FIGS. 3A, to 3G, in one embodiment, the gaming device provides at least one symbol or selection generator 100 with a plurality of sections 102. Each section is initially associated with and displays one of a plurality of different symbols or selections 104. For illustration purposes, each different selection is displayed as having one of a plurality of different characteristics, such as a letter, a number, a color or any suitable characteristic to distinguish the different selections. In this example, selection 104*a* is designated with the letter A, selection 104*b* is designated with the letter B, selection 104*c* is designated with the letter C, selection 104*d* is designated with the letter D and selection 104*e* (as seen in FIG. 3C) is designated with the letter E.

In one embodiment, a plurality of the selections are the same. In another embodiment, a plurality of the selections are different. In another embodiment, each of the selections is different. In one embodiment, each of the different selections is initially associated with at least one of the sections of the selection generator. In another embodiment, each of the different selections is initially associated with a plurality of the sections of the selection generator. In another embodiment, a plurality of the selections are each initially associated with at least one of the sections of the selection generator. In another embodiment, a plurality of the selections are each initially associated with a plurality of the sections of the selection generator. In this example, selections 104*a*, 104*b*, 104*c* and 104*d* are initially associated with the sections of the selection generator while selection 104*e* is not initially associated with any section of the selection generator.

In one embodiment, the selection generator includes at least one section indicator 106. In another embodiment, the selection generator includes a plurality of section indicators.

Each section indicator is adapted to indicate at least one of the selections of the selection generator (via indicating the section associated with the generated selection). In different embodiments, the number of section indicators is predetermined, randomly determined, determined based on the player's wager in a primary game, determined from the occurrence of one or more symbols in a primary game or determined based on any other suitable method.

In one embodiment, the gaming device also includes a plurality of different displayed accumulation meters or tracking sets 108*a*, 108*b*, 108*c*, 108*d* and 108*e* which are each associated with one of the different selections. For example, accumulation meter 108*a* is associated with selection 104*a*, accumulation meter 108*b* is associated with selection 104*b*, accumulation meter 108*c* is associated with selection 104*c*, accumulation meter 108*d* is associated with selection 104*d* and accumulation meter 108*e* is associated with selection 104*e*. Each tracking set or accumulation meter is adapted to monitor and display the number of times each selection is generated and accumulated. In an alternative embodiment, the gaming device includes one displayed accumulation meter which is operable to display the number of times each of the selections is accumulated.

In one embodiment, each selection is associated with an award. The awards may be values, prizes, modifiers or multipliers, progressive amounts, progressive amount meters, free spins, free games, game elements or any other suitable type of award. In one embodiment, each of the awards are different. In another embodiment, a plurality of the awards are different. In another embodiment, each of the awards are the same. In one embodiment, each of the awards associated with the selections is selected from one or more pools of awards. In another embodiment, each of the awards is selected from one or more ranges of awards. In another embodiment, each of the awards is associated with a probability and each of the awards is selected based on the associated probabilities. In different embodiments, the awards are predetermined, randomly determined, determined based on the player's wager in a primary game, determined from the occurrence of one or more symbols in a primary game or determined based on any other suitable method.

In this example, the awards associated with each selection are displayed adjacent to the accumulation meter associated with that selection, such that selection 104*a* is associated with an award value of one-hundred, selection 104*b* is associated with an award value of five-hundred, selection 104*c* is associated with an award value of two-hundred-fifty, selection 104*d* is associated with an award value of one-thousand and selection 104*e* is associated with an award value of fifty. In an alternative embodiment, at least one of the selections is a progressive award which is displayed adjacent to the accumulation meter associated with that selection.

In one embodiment, upon a suitable triggering event, the selection generator is activated to indicate, generate or pick a selection. The generated selection is accumulated, marked or tracked by the gaming device and the accumulation meter or tracking set associated with generated selection monitors and displays the accumulation of the generated selection. For example, as illustrated in FIG. 3B, the selection generator is activated to spin and the activate section indicator indicates the section associated with selection 104*b*, designated by the letter B. Accordingly, accumulation meter 108*b* displays an award value 110*b* which is associated with selection 104*b* and is accumulated to indicate the generation of selection 104*b*.

In one embodiment, each section is associated with an equal probability of being indicated. In another embodiment, a plurality of sections are each associated with a different weighted probability of being indicated. In another embodiment, each section is associated with a different weighted probability of being indicated.

In one embodiment, each generation of a selection causes the associated accumulation meter to be incremented by a designated amount, such as one. In another embodiment, different selections causes their associated accumulation meters to be incremented by different amounts. For example, if one selection is generated, the accumulation meter associated with that generated selection is incremented by one increment while if another selection is generated, the accumulation meter associated with that generated selection is increment by two increments. In different embodiments, the number of increments each selection will cause the accumulation meter associated with that generated selection to be incremented is predetermined, randomly determined, determined based on the player's wager in a primary game, determined from the occurrence of one or more symbols in a primary game or determined based on any other suitable method.

After accumulating the generated selection, the gaming device determines if any of the selections have been accumulated a designated number of times (i.e., if any of the tracking sets are complete). If at least one of the selections has been accumulated the designated number of times, the award associated with that selection is provided to the player and the game ends.

In one embodiment, the designated number of times each selection must be accumulated to cause the end of the game is different for a plurality of or each of the selections. For example, one selection must be accumulated three times to cause the end of the game while another selection must be accumulated five times to cause the end of the game. In another embodiment, each selection must be accumulated the same number of times to cause the end of the game. In different embodiments, the designated number of times each selection must be accumulated to cause the end of the game is predetermined, randomly determined, determined based on the player's wager in a primary game, determined from the occurrence of one or more symbols in a primary game or determined based on any other suitable method.

If at least one of the selections has not been accumulated the designated number of times, the gaming device replaces or changes the generated selection. In one embodiment, the replacement or change includes the gaming device replacing the generated selection with another designated selection. In one embodiment, the replacement is effective for at least one subsequent generation of the selection generator. In another embodiment, the replacement is effective for a plurality of subsequent generations of the selection generator. In another embodiment, the replacement is effective for each of the subsequent generations of the selection generation.

As illustrated in FIG. 3C, in this example, the gaming device replaced generated selection 104*b* with selection 104*e*. That is, the gaming device reassociated the selection initially associated with the indicated section of the selection generator from selection 104*b* to selection 104*e*. It should be appreciated that the section of the wheel is not changed or replaced, but rather the displayed selection associated with the indicated section is changed or replaced.

In one embodiment, the gaming device accumulates the replacement selection in the accumulation meter associated with the replacement selection. In another embodiment, the gaming device does not accumulate the replacement selection in the accumulation meter associated with the replacement selection In one embodiment, the same selection is chosen to replace each of the generated selections. In these embodiments, the same selection may be predetermined, randomly determined, determined based on the player's wager in a primary game, determined from the occurrence of one or more symbols in a primary game or determined based on any other suitable method. As illustrated in this example, each generated selection is replaced with selection 104*e*. In another embodiment, different selections are chosen to replace a plurality or each of the generated selections. In these embodiments, the different selections may be predetermined, randomly determined, determined based on the player's wager in a primary game, determined from the occurrence of one or more symbols in a primary game or determined based on any other suitable method.

In one embodiment, one selection is designated to replace one type of generated selection and another selection is designated to replace another type of generated selection. For example, selection 104*a* may replace each generated selection 104*b* while selection 104*c* may replace each generated selection 104*b*. In another embodiment, the replacement selection is one of the selections initially associated with one of the sections of the selection generator wheel. In another embodiment, the replacement selection is not one of the selections initially associated with one of the sections of the selection generator wheel.

It should be appreciated that as each generated selection is replaced with another replacement selection, the probability of the different selections being subsequently generated by the selection generator are changed. For example, if each selection initially has an equal probability of being generated by the selection generator (i.e., the sections associated with the selections have an equal probability of being indicated), when one selection is replaced, the generated selection has a lower changed probability of being subsequently generated by the selection generator and the replacement generator has a higher changed probability of being subsequently generated by the selection generator. For example, in the embodiment illustrated in FIGS. 3A to 3G, as each generated selection will be replaced by selection 104*e*, the more generations and replacements that occur in the game, the greater the probability that selection 104*e* will be accumulated the designated number of times and the award associated with selection 104*e* will be provided to the player. Accordingly, in this example, as selection 104*e* has the greatest probability of being accumulated the designated number of times as the game progresses, selection 104*e* is associated with the lowest award value.

As illustrated in FIG. 3D, after changing the generated selection, the gaming device activates the selection generator to generate or indicate another one of the plurality of selections (via indicating the section associated with the generated selection). The gaming device marks or accumulates the appropriate accumulation meter to reflect this generation and determines if any of the selections have been accumulated the designated number of times as described above. In this example, the active section indicator indicated the section associated with selection 104*c*, designated by the letter C. Accordingly, accumulation meter 110*c* which is associated with selection 104*c* is accumulated to indicate the generation of selection 104*c*. After determining that none of the accumulation meters or tracking sets are complete (i.e., have been incremented the designated number of three times), the gaming device replaces generated selection 104*c* with replacement selection 104*e* as illustrated in FIG. 3E.

In one embodiment, if the selection generator indicates a selection which previously replaced a prior generated selection, the gaming device does not subsequently modify that generated selection. For example, if the selection generator picks or indicates a section which has been reassociated with selection 104*e*, the gaming device will not modify selection 104*e*. In another embodiment, if the selection generator indicates a selection which previously replaced a prior generated selection, the gaming device subsequently changes or replaces that generated selection.

FIG. 3F illustrates the above described example after a plurality of generations of selections, a plurality of increments to the plurality of accumulation meters and a plurality of replacements of the generated selections. Specifically, selections 104*a*, 104*b* and 104*c* have each been generated, accumulated and replaced with selection 104*e* one additional time, selection 104*d* has been generated, accumulated and replaced with selection 104*e* two times and selection 104*e* has been generated and accumulated two times. As described above and illustrated in FIG. 3F, as selections 104*e* has replaced each of the previously generated selections, selection 104*e* now has a greater probability of being indicated by the selection generator than any of the other selections.

As illustrated in FIG. 3G, the gaming device generates or indicates another one of the plurality of selections (via indicating the section associated with the generated selection). The gaming device marks or accumulates the appropriate accumulation meter to reflect this generation and determines if any of the selections have been generated and accumulated the designated number of times as described above. In this example, the gaming device generated selection 104*b*, designated by the letter B. Accordingly, accumulation meter 110*b* which is associated with selection 104*b* is accumulated to indicate the generation of selection 104*b*.

Since selection 104*b* is accumulated the designated number of times, the gaming device provides the player the award associated with selection 104*b* and ends the game. In this case, the provided award of five-hundred associated with selection 104*b* is displayed in the award display and the game ends. Appropriate messages such as "GAME OVER" and "YOUR AWARD IS 500" may be provided to the player visually, or through suitable audio or audiovisual displays.

In another embodiment wherein the selection generator includes a plurality of active section indicators (not shown), if a plurality of tracking sets or accumulation meters are simultaneously completed, an award if formed and provided to the player based on the awards associated with each selection which is generated and accumulated the designated number of times.

It should be appreciated that any suitable method of picking one of a plurality of selections may be employed with the present invention. In one embodiment, rather than utilizing a selection generator, the gaming device provides a plurality of selections which the gaming device randomly picks in order to determine which selection will be accumulated and possibly changed to another selection.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each of a plurality of plays of a game, to:

(a) for a plurality of different groups of selections of at least three different groups of selections, initially display each of the selections of the plurality of groups of selections, wherein each of the at least three groups of selections includes a different plurality of selections, each of the at least three groups of selections is associated with one of a plurality of different awards, and one of the at least three groups of selections includes a plurality of designated selections;

(b) for said group of selections including the plurality of designated selections, initially display said award associated with said group of designated selections;

(c) cause a selection generator to randomly generate one of the displayed selections;

(d) accumulate said generated selection;

(e) display the accumulation of said generated selection, wherein the accumulation for each of the groups of selections is displayed separately;

(f) determine if any of said selections for any of the groups of selections have been accumulated a designated number of times, said designated number being at least two;

(g) if at least one of said selections for at least one of the groups of selections has been accumulated the designated number of times, display and provide a player the award associated with the group of selections that has been accumulated the designated number of times; and (h) if none of said selections for any of the groups of selections have been accumulated the designated number of times:

(i) replace said generated selection with one of the designated selections from the group of designated selections;

(ii) display the replacement of said generated selection, and (iii) repeat (c) to (h).

2. The gaming device of claim 1, wherein said plurality of instructions, when executed by the at least one processor, cause the at least one processor, for each of the plurality of plays of the game, to replace said generated selection with one of the designated selections, unless said generated selection is one of the designated selections.

3. The gaming device of claim 1, wherein said designated selection which replaces said generated selection is a predetermined one of the designated selections.

4. The gaming device of claim 1, wherein said designated selection which replaces said generated selection is a randomly determined one of the designated selections.

5. The gaming device of claim 1, wherein said selection generator includes a wheel with a plurality of sections, wherein each section is associated with one of said selections.

6. The gaming device of claim 5, wherein said plurality of instructions, when executed by the at least one processor, cause the at least one processor, for each of the plurality of plays of the game, to reassociate one of the designated selections with the section associated with the generated selection if at least one of said selections has not been generated the designated number of times.

7. The gaming device of claim 1, which includes a plurality of accumulation meters, each accumulation meter associated with a different one of said groups of selections and configured to operate to display the accumulation of said selections in said associated group of selections.

8. The gaming device of claim 1, wherein each selection is associated with a displayed characteristic.

9. The gaming device of claim 8, wherein said displayed characteristic includes a color.

10. The gaming device of claim 1, wherein the award associated with at least one of the groups of selections includes a progressive award.

11. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each of a plurality of plays of a game, to:

(a) for a plurality of different groups of symbols of at least three different groups of symbols, initially display each of the symbols of said plurality of groups of symbols, wherein each of the at least three groups of symbols includes a different plurality of symbols, each of the at least three groups of symbols is associated with one of a plurality of different awards, and one of the at least three groups of symbols includes a plurality of designated symbols;

(b) for said group of symbols including the plurality of designated symbols, initially display said award associated with said group of designated symbols;

(c) cause a symbol generator to randomly generate one of said displayed symbols;

(d) increment and display an accumulation meter associated with the generated symbol, wherein the accumulation meter is one of a plurality of different accumulation meters in said game, each of said accumulation meters is associated with a different one of said groups of symbols;

(e) determine if any of said accumulation meters have been incremented a predetermined number of times, said predetermined number of times being at least two;

(f) if at least one of said accumulation meters has been incremented the predetermined number of times, display and provide a player the award associated with the group of symbols associated with the accumulation meter incremented the predetermined number of times; and (g) if none of said accumulation meters have been incremented the predetermined number of times:

(i) replace said generated symbol with one of the designated symbols from the group of designated symbols, (ii) display the replacement of said generated symbol, and (iii) repeat (c) to (g).

12. The gaming device of claim 11, wherein said plurality of instructions, when executed by the at least one processor, cause the at least one processor, for each of the plurality of plays of the game, to replace said generated symbol with one of the designated symbols, unless said generated symbol is one of said designated symbols.

13. The gaming device of claim 11, wherein said designated symbol which replaces said generated symbol is a predetermined one of the designated symbols.

14. The gaming device of claim 11, wherein said designated symbol which replaces said generated symbol is a randomly determined one of the designated symbols.

15. The gaming device of claim 11, wherein the predetermined number of times a plurality of accumulation meters may be incremented is different for each accumulation meter.

16. The gaming device of claim 11, wherein the predetermined number of times each accumulation meter may be incremented is different for each accumulation meter.

17. The gaming device of claim 11, wherein said symbol generator includes a wheel with a plurality of sections, wherein each section is associated with one of said symbols.

18. The gaming device of claim 17, wherein the plurality of instructions, when executed by the at least one processor, cause the at least one processor, for each of the plurality of plays of the game, to reassociate one of the designated symbols with the section associated with the generated symbol if at least one of said symbols has not been generated the designated number of times.

19. The gaming device of claim 11, wherein each symbol is associated with a displayed characteristic.

20. The gaming device of claim 19, wherein said displayed characteristic includes a color.

21. The gaming device of claim 11, wherein the award associated with at least one of the groups of symbols includes a progressive award.

22. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each of a plurality of plays of a game, to:

(a) for a plurality of different groups of selections of at least three different groups of selections, initially display each of the selections of the plurality of groups of selections, wherein each of the at least three groups of selections is associated with one of a plurality of different outcomes and one of the at least three groups of selections includes a plurality of designated selections;

(b) for said group of selections including the plurality of designated selections, initially display said outcome associated with said group of designated selections;

(c) display and accumulate a plurality of random picks of said different selections and display each randomly picked selection being replaced by one of the designated selections from the group of designated selections until one of the selections is picked a designated number times, wherein the designated number is at least two, and wherein the accumulation for each of the groups of selections is displayed separately, and (d) display and provide one of the outcomes to the player based on the group of selections that has been picked the designated number of times.

23. The gaming device of claim 22, wherein the designated selection which replaces said picked selection is a predetermined one of the designated selections.

24. The gaming device of claim 22, wherein the designated selection which replaces said picked selection is a randomly determined one of the designated selections.

25. The gaming device of claim 22, wherein the designated number of times a plurality of said selections may be picked is different for each of said plurality of selections.

26. The gaming device of claim 22, wherein the designated number of times each of said selections may be picked is different for each of said selections.

27. The gaming device of claim 22, wherein each selection is associated with a displayed characteristic.

28. The gaming device of claim 27, wherein said displayed characteristic includes a color.

29. The gaming device of claim 22, wherein the outcome associated with at least one of the groups of selections includes a progressive award.

30. A method of operating a gaming device, for each of a plurality of plays of a game, said method comprising:

(a) for a plurality of different groups of selections of at least three different groups of selections, causing at least one processor to execute a plurality of instructions stored by at least one memory device to initially display each of the selections of the plurality of groups of selections, wherein each of the at least three groups of selections includes a different plurality of selections, each of said at least three groups of selections is associated with one of a plurality of different awards, and one of the at least three groups of selections includes a plurality of designated selections;

(b) for said group of selections including the plurality of designated selections, causing at least one processor to execute the plurality of instructions stored by at least one memory device to initially display said award associated with said group of designated selections;

(c) causing at least one processor to execute the plurality of instructions stored by the at least one memory device to randomly generate and display one of the plurality of the different selections;

(d) causing at least one processor to execute the plurality of instructions stored by the at least one memory device to accumulate and display said generated selection, wherein the accumulation for each of the groups of selections is displayed separately;

(e) causing at least one processor to execute the plurality of instructions stored by the at least one memory device to determine if any of said selections for any of the groups of selections have been accumulated a designated number of times, the designated number being at least two;

(f) if at least one of said selections for at least one of the groups of selections has been accumulated the designated number of times, causing at least one processor to execute the plurality of instructions stored by the at least one memory device to display and provide a player the award associated with the group of selections that has been accumulated the designated number of times; and (g) if none of said selections for any of the groups of selections have been accumulated the designated number of times:

(i) causing at least one processor to execute the plurality of instructions stored by the at least one memory device to replace and display said generated selection with one of the designated selections from the group of designated selections; and (ii) causing at least one processor to execute the plurality of instructions stored by the at least one memory device to repeat steps (c) to (g).

31. The method of claim 30, which includes causing at least one processor to execute the plurality of instructions stored by the at least one memory device to replace said generated selection with one of the designated selections, unless said generated selection is one of the designated selections.

32. The method of claim 30, wherein said designated selection which replaces said generated selection is a predetermined designated selection.

33. The method of claim 30, wherein said generated selection which replaces said generated selection is a randomly determined generated selection.

34. The method of claim 30, wherein each selection is associated with a displayed characteristic.

35. The method of claim 34, wherein said displayed characteristic includes a color.

36. The method of claim 30, wherein the award associated with at least one of the groups of selections includes a progressive award.

37. The method of claim 30, which is provided through a data network.

38. The method of claim 37, wherein the data network is an Internet.

39. A method of operating a gaming device, for each of a plurality of plays of a game, said method comprising:

(a) for a plurality of different groups of symbols of at least three different groups of symbols, causing at least one processor to execute a plurality of instructions stored by at least one memory device to initially display each of the symbols of the plurality of groups of symbols, wherein each of the at least three groups of symbols includes a different plurality of symbols, each of the at least three groups of symbols is associated with one of a plurality of different awards, and one of the at least three groups of symbols includes a plurality of designated symbols;

(b) for said group of symbols including the plurality of designated symbols, causing at least one processor to execute the plurality of instructions stored by at least one memory device to initially display said award associated with said group of designated symbols;

(c) causing at least one processor to execute the plurality of instructions stored by the at least one memory device to randomly generate and display one of the plurality of the different symbols;

(d) causing at least one processor to execute the plurality of instructions stored by the at least one memory device to display and increment an accumulation meter associated with the generated symbol, said incremented accumulation meter is one of a plurality of different accumulation meters, wherein each of said different accumulation meters is associated with a different one of said groups of symbols;

(e) causing at least one processor to execute the plurality of instructions stored by the at least one memory device to determine if any of said accumulation meters have been incremented a predetermined number of times, the predetermined number being at least two;

(f) if at least one of said accumulation meters has been incremented the predetermined number of times, causing at least one processor to execute the plurality of instructions stored by the at least one memory device to display and provide a player the award associated with the group of symbols associated with the accumulation meter incremented the predetermined number of times;

(g) if none of said accumulation meters have been incremented the predetermined number of times:

(i) causing at least one processor to execute the plurality of instructions stored by the at least one memory device to replace and display said generated symbol with one of the designated symbols from the group of designated symbols; and (ii) causing at least one processor to execute the plurality of instructions stored by the at least one memory device to repeat steps (c) to (g).

40. The method of claim 39, which includes causing at least one processor to execute the plurality of instructions stored by the at least one memory device to replace said generated symbol with one of the designated symbols, unless said generated symbol is one of the designated symbols.

41. The method of claim 39, wherein said designated symbol which replaces said generated symbol is a predetermined designated symbol.

42. The method of claim 39, wherein said designated symbol which replaces said generated symbol is a randomly determined designated symbol.

43. The method of claim 39, wherein the predetermined number of times a plurality of accumulation meters may be incremented is different for each accumulation meter.

44. The method of claim 39, wherein the predetermined number of times each accumulation meter may be incremented is different for each accumulation meter.

45. The method of claim 39, wherein each symbol is associated with a displayed characteristic.

46. The method of claim 45, wherein said displayed characteristic includes a color.

47. The method of claim 39, wherein the award associated with at least one of the groups of symbols includes a progressive award.

48. The method of claim 39, which is provided through a data network.

49. The method of claim 48, wherein the data network is an Internet.

50. A method of operating a gaming device, for each of a plurality of plays of a game, said method comprising:

(a) for a plurality of different groups of selections of at least three different groups of selections, causing at least one processor to execute a plurality of instructions stored by at least one memory device to initially display each selection of the plurality of groups of selections, wherein each of the at least three groups of selections is associated with one of a plurality of different outcomes and one of the at least three groups of selections includes a plurality of designated selections;

(b) for said group of selections including the plurality of designated selections, causing at least one processor to execute the plurality of instructions stored by at least one memory device to initially display said outcome associated with said group of designated selections;

(c) causing at least one processor to execute the plurality of instructions stored by the at least one memory device to randomly pick and accumulate one of said plurality of different selections, wherein said picked selection is replaced by one of the designated selections from the group of designated selections, and wherein the accumulation for each of the groups of selections is displayed separately;

(d) causing at least one processor to execute the plurality of instructions stored by the at least one memory device to repeat (c) until one of the selections is picked a designated number times, wherein the designated number is at least two; and (e) when one of the different selections is picked the designated number of times, causing at least one processor to execute the plurality of instructions stored by the at least one memory device to display and provide a player the outcome associated with said group of selections that has been picked the designated number of times.

51. The method of claim 50, wherein the designated selection which replaces said picked selection is a predetermined one of the designated selections.

52. The method of claim 50, wherein the designated selection which replaces said picked selection is a randomly determined one of the designated selections.

53. The method of claim 50, wherein the designated number of times a plurality of said selections may be picked is different for each of said plurality of selections.

54. The method of claim 50, wherein the designated number of times each of said selections may be picked is different for each of said selections.

55. The method of claim 50, wherein each selection is associated with a displayed characteristic.

56. The method of claim 55, wherein said displayed characteristic includes a color.

57. The method of claim 50, wherein the outcome associated with at least one of the groups of selections includes a progressive award.

58. The method of claim 50, which is provided through a data network.

59. The method of claim 58, wherein the data network is an Internet.

60. The gaming device of claim 1, wherein for a plurality of the groups of selections, the designated number of times said selections of said group of selections may be accumulated is different.

61. The gaming device of claim 1, wherein for each of the groups of selections, the designated number of times said selections of said group of selections may be accumulated is different.

62. The method of claim 30, wherein for a plurality of the groups of selections, the designated number of times said selections of said group of selections may be accumulated is different.

63. The method of claim 30, wherein for each of the groups of selections, the designated number of times said selections of said group of selections may be accumulated is different.

* * * * *

UNITED STATES PATENT AND TRADEMARK OFFICE

CERTIFICATE OF CORRECTION

PATENT NO. : 7,666,089 B2
APPLICATION NO. : 10/956768
DATED : February 23, 2010
INVENTOR(S) : Rodgers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 738 days.

Signed and Sealed this

Seventh Day of December, 2010

David J. Kappos

*Director of the United States Patent and Trademark Office*